Figure 1:
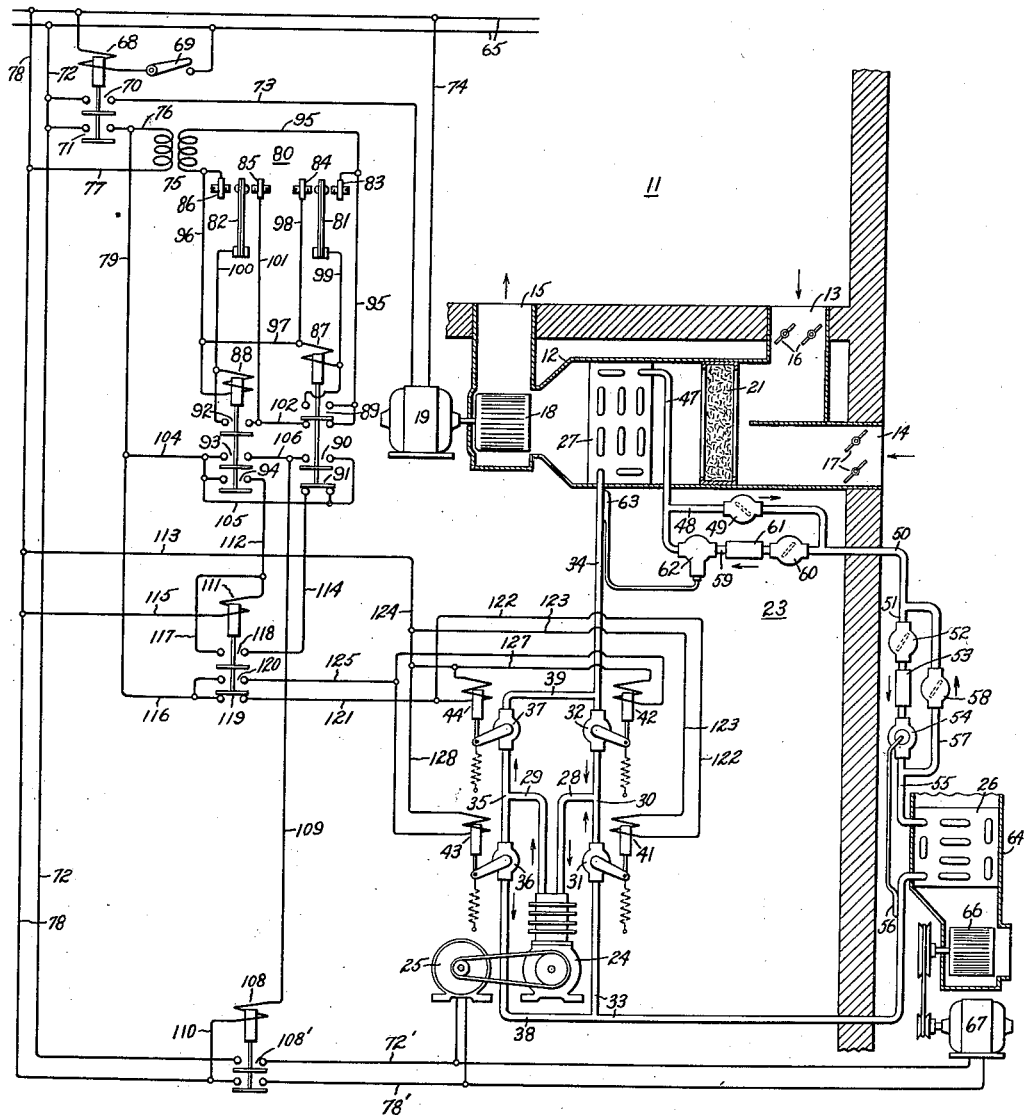

Dec. 5, 1939.    H. R. CRAGO    2,182,691
CONDITION CONTROL SYSTEM
Filed May 20, 1937    2 Sheets-Sheet 2
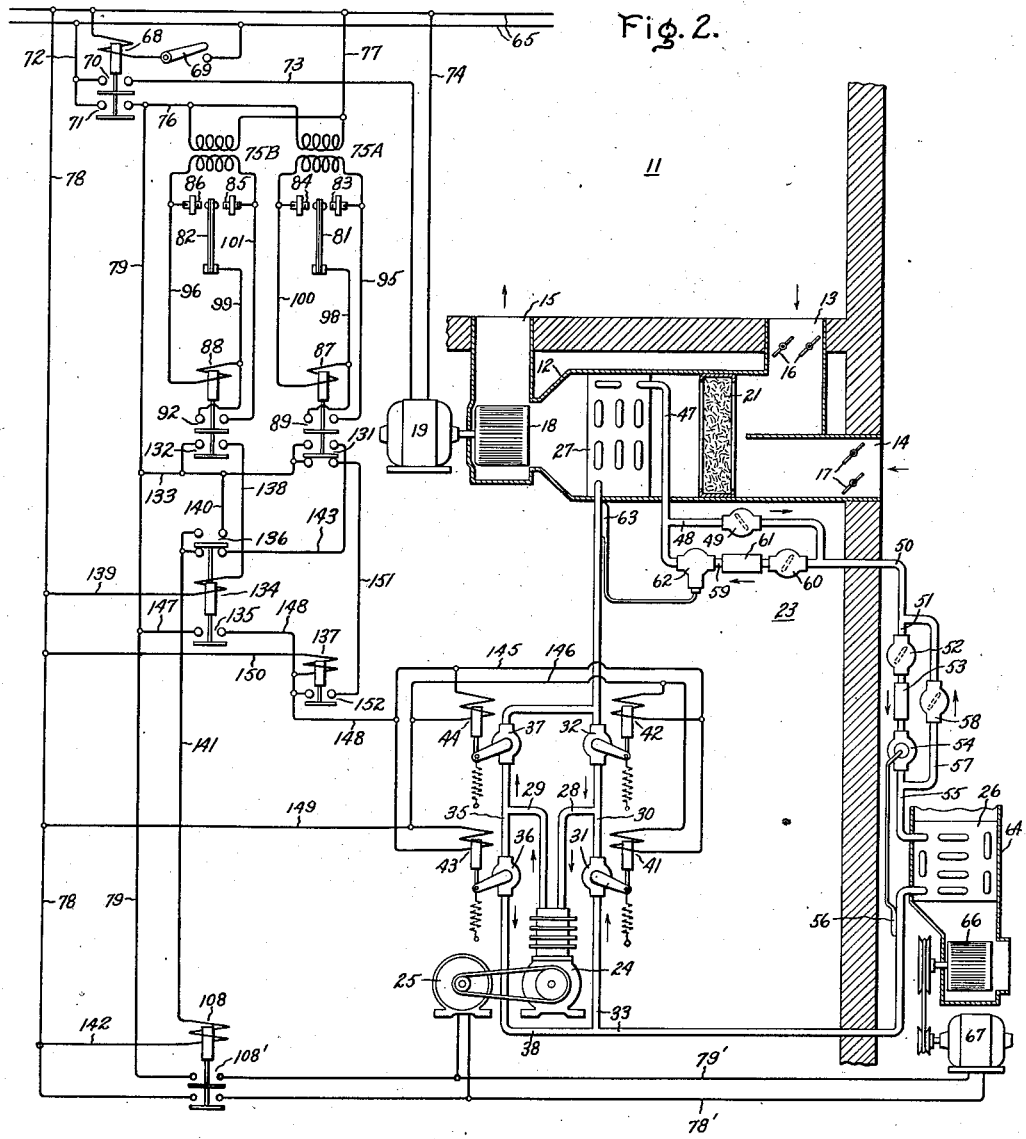
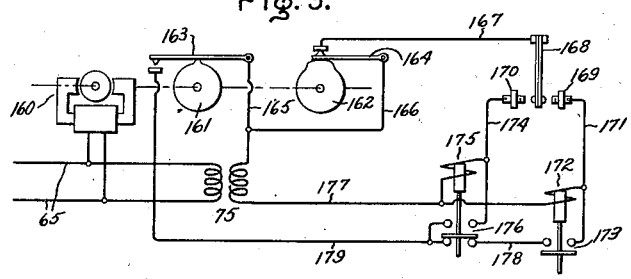
Inventor:
Harry R. Crago,
by Harry E. Dunham
His Attorney.

Patented Dec. 5, 1939

2,182,691

UNITED STATES PATENT OFFICE 2,182,691

CONDITION CONTROL SYSTEM

Harry R. Crago, Verona, N. J., assignor to General Electric Company, a corporation of New York Application May 20, 1937, Serial No. 143,753

7 Claims. (Cl. 62—6)

My invention relates to condition control systems and more particularly to an automatic system adapted to maintain an enclosure within predetermined temperature limits under all atmospheric conditions.

To maintain conditions within an enclosure between predetermined minimum and maximum values year around it is necessary that condition changing means capable of performing the functions of raising or lowering the value of the condition be employed. For example, in controlling the temperature of an enclosure it is necessary that the temperature changing means employed be capable of performing both heating and cooling functions. In automatically controlled systems the control, therefore, must be capable of controlling operation of the temperature changing means during the performance of both functions and to change over from one function to the other. The former requires the reversal with respect to temperature of the thermal responsive means over the operation controlling means or the transfer of control from one thermal responsive means to another. The latter requires transfer from one temperature changing means to another or, in case the temperature changing means is capable of performing both functions the change over from one phase to another.

The primary object of my invention is the provision of a condition control system in which the function selecting means is adapted to condition the condition changing means for the performance of a selected function only on an initial call for that function. A further object of my invention is the provision of an improved condition control system in which the function selecting means is adapted to condition the condition changing means for the performance of a selected function only upon an initial call for that function and to control the operation of the condition changing means on that initial call and subsequent successive calls for that function.

A more specific object of my invention is the provision of an improved temperature control system employing heating and cooling means in which these means are selectively conditioned for and their operation controlled by means actuated in response to variations in the temperature within the enclosure.

A further and more specific object of my invention is to provide a temperature changing means for an enclosure utilizing a reversible temperature changing apparatus having a single motive means for operating the same and a conduit system, a part of which is used during both phases of operation, whereby the conduit system is conditioned for operation to perform a predetermined function on an initial call for that function and the motive means is placed in operation on the initial call and subsequent successive calls for that same function.

Another object of my invention is to provide a control for a pair of control devices including condition responsive means for exerting a control function over both devices upon an initial change of the condition beyond a predetermined value and thereafter over one of said devices upon succeeding changes beyond that value.

Further objects and advantages of my invention will become apparent as the following description proceeds, and the feature of novelty which characterize my invention will be pointed out with particularity in the claims annexed to and forming part of this specification.

For a better understanding of my invention reference may be had to the accompanying drawings in which Fig. 1 shows diagrammatically temperature changing apparatus designed for year around operation and illustrates schematically a control system therefor embodying the features of the present invention; Fig. 2 illustrates schematically a modified form of control system; and Fig. 3 illustrates a modification of condition responsive means adapted for use with the control systems illustrated in Figs. 1 and 2.

Referring now to Fig. 1, reference numeral 11 indicates an enclosure such as a building, room or the like, adapted to be supplied with an air conditioning medium such as air. The air is supplied to the enclosure by an air conditoner 12 located without said space and provided with the usual recirculating air duct 13, a fresh air duct 14 and a discharge duct 15. The proportions of fresh and recirculated air may be controlled by dampers 16 and 17 positioned in the recirculated and fresh air ducts, respectively. These may be controlled either manually or automatically in response to indoor or outdoor temperature conditions. Air is circulated through the conditioner and to the enclosure by suitable continuously operating air circulating means such as fan 18 positioned in the discharge duct and driven by an electric motor 19 controlled in a manner hereinafter to be described. The air passing through the conditioner is suitably cleaned by an air filter 21 and may be humidified by any suitable means (not shown).

The temperature of the air passing through the conditioner is suitably controlled in response to variations in temperature within the enclosure by means of temperature changing means indicated generally by reference numeral 23. The temperature changing means is illustrated as a heat pump which is capable of performing, as is well known, both heating and cooling functions. It should be understood, however, that my invention is not limited to temperature changing means of this type but is adapted for use with all reversible heat exchange systems as well as with other systems adapted to perform the dual functions of heating and cooling. It is equally well adapted for use with unitary apparatus of the type described and with systems employing heating and cooling means of conventional form.

The heat pump 23 is actually a reversible refrigerating system comprising a compressor 24 suitably driven by an electric motor 25 and two heat exchangers or evaporator-condensers 26 and 27. Evaporator-condenser 26 is located outside of the enclosure, preferably outdoors, and the evaporator-condenser 27 is located within conditioner 12 so that it may either heat or cool the air supplied to the enclosure. The compressor is reversibly connected to the evaporator-condensers through a low pressure suction conduit 28 and a high pressure discharge conduit 29. Conduit 28 is connected to a conduit 30 which is adapted selectively to be connected by valves 31 and 32, biased to closed positions by springs, to conduits 33 and 34 leading to the evaporator-condensers 26 and 27, respectively. Conduit 29 is similarly connected to a conduit 35 adapted selectively to be connected by valves 36 and 37, also biased to closed positions by springs, to conduits 38 and 39 connected to the evaporator-condensers through the previously mentioned conduits 33 and 34.

In order that the phase of operation of the heat pump may be reversed in response to temperature variations within the enclosure the valves 31, 32, 36 and 37 are provided with valve operating solenoids 41 to 44, inclusive, of which solenoids 41 and 44 are adapted to be energized to open valves 31 and 37 to condition the heat pump for performance of a heating function and solenoids 42 and 43 are adapted to be energized to open valves 32 and 36 to condition the heat pump for the performance of a cooling function. From Fig. 1 it will be noted that when the heat pump is conditioned for heating by the opening of valves 31 and 37 the flow of compressed gaseous refrigerant will be from the high pressure discharge conduit 29 to the heat exchanger 27, now acting as a condenser to supply heat to the air through conduit 35, valve 37, and conduits 39 and 34. The compressed gaseous refrigerant liberates heat as it condenses in the indoor heat exchanger 27. The condensed refrigerant then flows to the outdoor heat exchanger (acting as an evaporator during heating) through conduit 47, a branch conduit 48 provided with a check valve 49 permitting flow of refrigerant away from the heat exchanger 27, conduit 50, a branch conduit 51 provided with a check valve 52 permitting flow in the same direction as valve 49, a scale trap 53 and a thermostatically controlled expansion valve 54, and conduit 55. Valve 54 is controlled in a well known manner in response to variations in temperature of the refrigerant leaving the heat exchanger 26 by a thermostatic bulb 56. The refrigerant absorbs heat by vaporization in exchanger 26 and is returned to the suction side of the compressor through conduits 33, valve 31 and conduits 30 and 28. Thus during heating operation, heat is pumped from exchanger 26 to exchanger 27.

When the heat pump is conditioned for cooling by opening of valves 32 and 36 the refrigerant flow will be the reverse of that described above and heat exchanger 26 will act as the condenser and heat exchanger 27 as the evaporator so as to pump heat from exchanger 27 to exchanger 26. The flow will be from the discharge conduit 29 to the outdoor heat exchanger through conduit 35, valve 36, and conduits 38 and 33. From thence the refrigerant flows to the indoor heat exchanger through conduit 55, a branch conduit 57 in parallel with conduit 51 and provided with a check valve 58 permitting flow of refrigerant away from heat exchanger 26 (a direction opposite that permitted by valve 52), conduit 50, a branch conduit 59 in parallel with conduit 48 and provided with a check valve 60 permitting flow of refrigerant in the same direction as valve 58, a scale trap 61 and a thermostatic expansion valve 62, and conduit 47. The refrigerant is returned to the compressor through conduit 34, valve 32 and conduits 30 and 28. The thermostatic expansion valve 62 is controlled by a thermostatic bulb 63 in the same manner as valve 54.

In order to increase the capacity of the outdoor heat exchanger the latter is provided with an enclosure or casing 64 having an outdoor air inlet and provided with an air circulating means 66 driven by suitable means such as a motor 67 adapted to be energized whenever the heat pump is placed in operation. This arrangement provides forced circulation of outdoor air about the heat exchanger 26.

The various valve operating solenoids conditioning the heat pump system for operation for either heating or cooling and controlling the operation of the compressor motor 25 and fan motor 67 are preferably, but not necessarily, under the control of thermal responsive means 80 positioned within the enclosure. The control system is so arranged that electricity may be supplied to the thermal control 80 and the various electrical operated parts of the system from supply conductors 65 only when the main circulating fan driving motor 19 is in operation. The fan motor is controlled by means of a relay 68, adapted to be energized by closure of a manually operable switch 69, controlling a pair of normally open switches 70 and 71. The former provides an energizing circuit for the fan motor through conductors 72, 73 and 74 and the latter an energizing circuit for the primary winding of a transformer 75 providing the thermal control with suitable low voltage electricity. The energizing circuit for the primary winding extends through the previously mentioned conductor 72, switch 71 and conductors 76 and 77 and a branch supply conductor 78. Relay 68 thus controls also the supply of energy to the remainder of the electrical control apparatus which receives energy through a branch supply conductor 79 connected to conductor 76.

The enclosure thermal responsive means illustrated generally by reference numeral 80 consists of a pair of bimetallic thermal responsive elements 81 and 82 each positioned within the enclosure and having associated therewith a pair of adjustably mounted contacts 83, 84 and 85, 86, respectively. The thermal responsive means 81, hereinafter to be termed the heating thermostat, controls the energization of a control means such as a relay 87. The thermal responsive element 82, hereinafter to be referred to as the cooling thermostat, controls the energization of a second control means such as relay 88. Relay 87 controls a plurality of switches 89, 90 and 91 and relay 88 controls switches 92, 93 and 94. Switches 89 and 92 are adapted to close holding circuits for their respective relays whenever the latter are energized and switch 89 also provides an interlocking arrangement whereby relay 88 may be energized only when the switch is in its lowermost (illustrated) position. The remaining switches 90, 91 and 93, 94 selectively control the valve operating solenoids and operation of the heat pump through intermediate control means to be described hereinafter.

The circuit connections for the thermal control 80 include a conductor 95 leading from one side of the transformer 75 to the previously mentioned contact 83 and to one of the upper and lower contacts associated with switch 89. The other side of the primary winding is connected by a conductor 96 to contact 86 to one terminal of the relay winding 88 and by a branch conductor 97 to one terminal of the relay winding 87. Conductor 97 is in turn connected by conductor 98 to contact 84. The thermal responsive element 81 is connected by a conductor 99 to the other terminal of relay winding 87 and to one of the pair of upper contacts associated with switch 89. Thermal responsive element 82 is connected by a conductor 100 to the relay winding 88 and to one of the contacts associated with switch 92. Contact 85 is connected by a conductor 101 to a conductor 102 interconnecting one of the contacts associated with switch 92 to one of the lower and normally closed contacts associated with switch 89.

The thermal responsive elements 81 and 82 of the thermostats are so arranged that they move in opposite directions in response to temperature variations, element 81 moving to the right and element 82 to the left on a decrease in temperature. The thermostats may be adjusted to operate at any desired temperatures and in the present illustration it will be assumed that element 81 engages contact 83 at a temperature of 70° and contact 84 at 72° and that element 82 engages contacts 85 and 86 at temperatures of 80° and 78°, respectively. It will be noted that a two degree differential has been assumed but in some cases it may be more and in others less than this value.

When the temperature decreases to 70° element 82 is in engagement with contact 86, thereby short circuiting relay 88, and element 81 engages contact 83, thereby energizing relay 87 through a circuit extending from the secondary winding of the transformer through conductor 95, contact 83, bimetallic element 81, and conductor 99 to the relay winding 87 and thence through conductors 97 and 96 back to the secondary winding. Energization of relay 87 effects movement of switch 89 into engagement with its upper normally open contacts to establish a holding circuit for the relay 87 through the conductors 95 and 97. The movement of switch 89 into its upper position breaks the circuit from one side of the secondary winding through conductor 102 to the cooling thermostat and thus prevents the energization of relay 88 by the cooling thermostat 82 whenever the heating thermostat 81 is in the relay energizing position. This arrangement whereby the heating thermostat takes precedence on a simultaneous movement of the thermostats to their relay energizing positions is a modification of that disclosed and claimed in my prior application, Serial No. 100,119, filed September 10, 1936, and assigned to the assignee of the present application. When the emperature rises to 72° the bimetallic element 81 engages contact 84, thereby short circuiting relay winding 87 through conductors 98 and 99.

The control of the cooling thermostat over the relay 88 is substantially the same as that just described. Whenever element 82 engages contact 85 relay 88 is energized through a circuit extending from the sectondary winding through conductor 95, switch 89 in its lower position, conductors 102, 101, contact 85, bimetallic element 82 and conductor 100 to the relay winding and thence through conductor 96 to the other side of the secondary winding. Energization of the relay effects closure of switch 92 to establish a holding circuit for itself through the switch 92 and conductor 102.

Whenever the heating thermostat 81 energizes its associated relay upon an initial call for heat the previously mentioned valve operating solenoids 41 and 44 adapted when energized to condition the heat pump 23 for heating are energized as are the compressor motor 25 and the fan motor 67 energized. The control is so arranged that after satisfaction of the initial call for heat the solenoids 41 and 44 remain energized even though compressor motor 25 and fan motor 67 are deenergized. Upon subsequent successive calls for heating the compressor motor 25 and auxiliary fan motor 67 only will be energized. Upon an initial call for cooling solenoids 41 and 44 are deenergized and solenoids 42 and 43 adapted when energized to condition the heat pump for cooling are energized along with the compressor motor 25 and fan motor 67. After satisfaction of the initial call for cooling solenoids 42 and 43 remain energized but the fan and compressor motors only are deenergized. Upon subsequent successive calls for cooling only the compressor and fan motors will be energized. In other words, the valves are operated to condition the heat pump conduits for heating and cooling only upon initial calls for these functions by the room thermostat.

Energy is supplied to the valve operating solenoids and the compressor and fan motors through branch conductor 72 under the control of switches 90, 91, 93 and 94 controlled by the room thermostats. A conductor 104 leads from conductor 79 to a conductor 105 and through these conductors to one each of the pairs of contacts associated with switches 90, 91, 93 and 94. A conductor 106 interconnects the remaining contact of switch 93 to one of the pair of contacts associated with switch 90.

The energization of the compressor and fan motor is controlled by a relay 108 connected by a conductor 109 to the previously mentioned conductor 106 and adapted when energized to connect the motors to the supply conductors through a switch 108' and conductors 78' and 72'. The relay 108 is energized upon operation of either switches 90 and 93 to their circuit closing position by their respective relays, the energizing circuit for the relay extending across the branch supply conductors 79 and 78 through a circuit including conductors 104, 105, either of the two switches and conductors 106 and 109, the relay winding and conductor 110.

The selective energization of the valve operating solenoids is controlled by a relay 111 which in turn is controlled by switches 91 and 94.

Opening of switch 91 by the heating thermostat 81 deenergizes a holding circuit for the relay 111 and closure of switch 94 by the cooling thermostat 82 establishes an energizing circuit for the relay 111. When once energized the relay 111 establishes a holding circuit for itself through switch 91 so that it will remain energized until switch 91 is opened. The energizing circuit extends from the branch supply conductor 79 through conductor 104, switch 94, conductor 112 to the relay and thence through conductor 115 to the other supply conductor 78. The holding circuit extends from supply conductor 79 through conductor 105, switch 91, conductor 114, a switch 118 operable to a closed position by the relay 111 upon energization thereof, and conductor 117 to the relay and thence through conductors 115 to the other supply conductor 78.

The relay 111 is adapted to energize valve operating solenoids 41 and 44 through a normally closed switch 119 operated thereby when deenergized (its illustrated position) by the heating thermostat 81 and to energize solenoids 42 and 43 through a normally open switch 120 operated thereby when energized by the cooling thermostat 82. The energizing circuit for solenoids 41 and 44 extends from supply conductor 79, conductor 116, switch 119 and conductors 121 and 122 connected to solenoids 44 and 41, respectively, and thence through conductors 123 and 124, and 113 to the supply conductor 78. The energizing circuit for solenoids 42 and 43 extends from branch conductor 79 through conductors 116, switch 120, conductor 125 to the solenoid windings 42, 43 and thence through conductors 127 and 128 to conductor 124 and 113 to supply conductor 78.

The operation of the system as a whole will become more clear from the following description. To place the system in operation the manually operable switch 69 is closed to energize relay 68. Thereupon the relay effects closure of switches 70 and 71, the former energizing the main fan motor 19 to start circulation of air throughout the conditioner, and the latter energizing the thermal control 80 and supplying energy to the branch conductor 79.

It having been assumed that heating is desired at temperatures below 70° and cooling at temperatures above 80° then, when these temperature limits are exceeded, the heating and cooling thermostats selectively energize their associated relays 87 and 88. The apparatus is illustrated in a position in which it would be left after a heating operation, i. e., the selective valve control relay 111 is deenergized. After closure of manual switch 69 the heat pump will be immediately conditioned for heating by energization of the valve operating solenoids 41 and 44 by reason of the fact that relay 111, being deenergized, effects closure of switch 119 and closure of the previously described energizing circuit for these solenoids 41, 44. Solenoids 41 and 44 open valves 31 and 37 conditioning the conduit system for the flow of refrigerant from the compressor to heat exchanger 27 (now acting as a condenser) and thence through the outdoor heat exchanger 26 (now acting as an evaporator) back to the compressor.

Upon a subsequent call for heating by the heating thermostat the relay 87 is energized. For purpose of brevity the various energizing circuits will be omitted in the description of operation as they have been described in detail above. The energization of relay 87 effects closure of switches 89 and 90 and the opening of switch 91. Switch 89 establishes a holding circuit for the winding of relay 87. Switch 90 energizes relay 108 to initiate operation of the compressor motor 25 and fan motor 67 through closure of its contacts 108'.

The heat pump continues to operate until the temperature requirements within the enclosure have been satisfied. When this condition obtains the heating thermostat short circuits relay 87 and the latter effects the opening of its associated switches. Its holding circuit is opened by switch 89 and the opening of switch 90 deenergizes relay 108 to thereby terminate operation of the fan and compressor motors of the heat pump.

The system continues to operates intermittently in the described manner upon subsequent successive calls for heat, the heating thermostat intermittently placing the heat pump into operation to perform the heating function.

Assume now that outdoor atmospheric conditions moderate and the enclosure temperature is between 72° and 80°. Under these conditions both thermostats are in positions wherein their associated relays are deenergized and the heat pump inoperative.

Upon further change in outdoor conditions resulting in an enclosure temperature of 80° the cooling thermostat 82 energizes relay 88 and the latter effects closure of its associated switches 92 to 94, inclusive. Switch 92 establishes a holding circuit for the relay, switch 94 effects energization of relay 111 to condition the heat pump valves 42, 43 for cooling and switch 93 energizes relay 108 to again initiate operation of the compressor motor 25 and fan motor 67. In changing the valves over from heating to cooling the relay 111 effects closure of valves 31 and 37 by deenergization of solenoids 41 and 44 through the opening of switch 119 and at the same time effects opening of valves 32 and 36 by energization of solenoids 42 and 43 through closure of switch 120. The opening of valves 32 and 36 conditions the heat pump conduit system for cooling, the refrigerant flowing from the compressor to the outdoor heat exchanger 26 (now acting as a condenser) and from thence to the indoor heat exchanger 27 (now acting as an evaporator) back to the compressor.

The relay 111 when once energized establishes a holding circuit for itself by closure of switch 118 so that it remains energized until a call for heating occurs. When cooling requirements are satisfied the cooling thermostat short circuits relay 88 and the latter opens its associated switches. Switch 92 opens the holding circuit for the relay 88, switch 93 terminates operation of the heat pump by deenergizing relay 108, and switch 94 opens the initial energizing circuit for relay 111. However, the latter remains energized through its holding circuit.

On a subsequent call for cooling relay 88 is again energized to close its associated switches. The latter establish the previously described holding circuit for the relay and energize relay 108 to initiate operation of the heat pump but have no effect on relay 111 as it has remained energized through its holding circuit. Successive intermittent calls for cooling result merely in the intermittent operation of the heat pump in the performance of a cooling function.

From the preceding description it will be obvious that upon a subsequent call for heating the relay 111 will be deenergized by switch 91 controlled by the heating thermostat to deenergize solenoids 42 and 43 and energize solenoids 41 and 44. The latter open valves 31 and 37 to condition the heat pump conduit system for heating. On the initial call for heat the relay 108 is energized by closure of switch 91 and the heat pump placed into operation.

Those skilled in the art will note from the above that I have provided a control in which the heat pump apparatus is conditioned for the performance of a predetermined function upon a first call for that function and the apparatus is placed into operation not only upon the initial call for performance of that function, but also upon successive subsequent performances of that function. My invention may be applied in the control of dampers or the like which are to have predetermined position during heating or cooling as well as to the valve system described.

In the modification of Fig. 2 the enclosure thermal control 80 of Fig. 1 has been replaced by independent conventional double contact thermostats, each provided with its own transformer. These have been labeled 75A and 75B. A further difference in the thermal control resides in the elimination of the connections whereby the heating thermostat takes precedence in case the two thermostats are adjusted to operate in the same range.

The primary difference between the two systems, however, resides in a change in the manner of controlling energization of the valve operating solenoids 43, 44, 41 and 42. In some localities, as in the northern parts of the temperature zone the periods during which heating is required exceed the cooling periods. In order to provide a more economical system the solenoids 41 and 44 of Fig. 2 are associated with normally open valves so that during heating the solenoids are deenergized. All the solenoids are energized during cooling, but since this is over a shorter period of time the total cost over the year is less.

In the description of the modification illustrated in Fig. 2 reference numerals corresponding to those used in Fig. 1 have been used for the parts of the heat pump, fans, and thermal control. The heating and cooling thermostats control relays 87 and 88, respectively and the relays are energized when the thermostats engage their right-hand contacts and deenergize when the thermostats engage their left-hand contacts. The relays have associated therewith switches 89 and 92, respectively, adapted when closed to establish holding circuits for the relays.

The valve operating solenoids, compressor and fan motors are controlled by a pair of switches 131 and 132 controlled by the heating and cooling thermostats, respectively. Switch 131 comprises an upper pair of normally closed and a lower pair of normally opened contacts. Switch 132 comprises a pair of normally open contacts. One contact of each of the pairs of contacts is connected to the branch supply conductor 79 through a conductor 133.

The control of operation of the fan and compressor motors and the energization of the valve operating solenoids is in part through a relay 134 energized on a call for cooling by the cooling thermostat and controlling through a pair of switches 135 and 136 operated thereby the energization of the valve operating solenoids and the relay 108 controlling the energization of the fan and compressor motors. The solenoids are initially energized through switch 135 and once energized are so maintained by a relay 137 which locks itself in and closes an independent energizing circuit for the solenoids.

The circuit connections for the various control relays include an energizing circuit for relay 134 extending from supply conductor 79 through conductor 133, switch 132, and conductor 138 to the relay and thence through conductor 139 to the other supply conductor 78. It may be noted that relay 134 will be energized simultaneously with relay 88 under the cooling control of the thermostat.

Energizing circuits for the compressor and fan motor control relay 108 are closed upon a call for heating or a call for cooling. Upon a call for cooling, the circuit extends from supply conductor 79 through conductor 133, conductor 140, switch 136 in its upper position (relay 134 being always energized on a call for cooling) and conductor 141 to relay 108 and thence through conductor 142 to the other supply conductor 78. Upon a call for heating the circuit extends from supply conductor 79 through conductor 133, switch 131 in its upper position, conductor 143, switch 136 in its lower position and thence through conductor 141 to the relay and back to supply conductor 78 through conductor 142.

The initial energizing circuit for the valve operating solenoids 41 to 44, inclusive, all connected for simultaneous energization by conductors 145 and 146 extends from supply conductor 79 through conductor 147, switch 135, conductor 148 and conductor 145 to the solenoids and thence through conductors 146 and 149 to the other supply conductor 78.

The initial energizing circuit for relay 137 includes that portion of the preceding circuit to conductor 148 leading to the relay and thence through conductor 150 to supply conductor 78.

The holding circuit whereby relay 137 locks itself in and maintains the solenoids energized until an initial call for heating extends from supply conductor 79 through conductor 133, switch 131 in its lower position, conductor 151, a normally open switch 152 operated by the relay and conductor 148 to the relay and thence through conductor 150 back to the other supply conductor 78. The interposition of the normally closed contacts of switch 131 in this circuit permits rupture of this holding circuit upon an initial call for heating to thereby deenergize the solenoids and condition the conduit system for heating.

The operation of the system will be amplified by a consideration of operation upon successive demands for heating and cooling. Upon a first call for heating after closure of manual switch 69 the heating thermostat 81 closes a circuit energizing relay 87. The latter closes a holding circuit for itself by closure of switch 89 and also initiates operation of the fan and compressor motor by closure of the normally open contacts of switch 131. The energization of the fan and compressor motors results from the energization of relay 108 through a circuit that has been previously described and closure of switch 108' by the relay. The heat pump conduit system is conditioned for heating upon a call for heating because relays 134 and 137 are deenergized, thereby deenergizing all the solenoids. Under these conditions the normally open valves 31 and 37 are open to condition the system for heating. The heat pump continues to operate until the room temperature has been raised to a predetermined high value at which time the relay 87 is short circuited and deenergized. Switch 89 is opened and switch 131 opens its upper contacts to deenergize relay 108 and effect termination of operation of the fan and compressor motors. Closure of the lower contacts of switch 131 has no effect upon the energization of relay 137 as its holding circuit through switch 131 has been broken by switch 152.

Upon further successive calls for heating, the operation will be as described above with the heating thermostat controlling only the operation of compressor motor 25 and fan motor 67.

On an initial call for cooling the heat pump conduit system is conditioned for cooling by energization of the valve operating solenoids which close valves 31 and 37 and open valves 32 and 36. The fan and compressor motors are likewise placed into operation. The valve solenoids are initially energized through closure of which 135 by relay 134 which in turn is energized by closure of switch 132 under control of the cooling thermostat. Switch 135 also energizes relay 137 and the latter locks itself in and maintains the solenoids energized through the holding circuit including switch 152 and switch 131 in its normally closed position. The fan and compressor motors are placed into operation by energization of relay 108 which is energized by actuation switch 136 to close its normally open contacts.

The heat pump is operative to cool the enclosure until the cooling requirements are satisfied and relay 88 deenergized. At this time relay 134 will be deenergized by the opening of switch 132 and it in turn deenergizes relay 108 through switch 136 to terminate operation of the heat pump. Switch 135 is also opened upon deenergization of relay 134 but relay 137 remains energized through its holding circuit to maintain the heat pump conditioned for cooling.

On succeeding calls for cooling the cooling thermostat controls the fan and compressor motors through energization of relay 134 and energization thereby of relay 108.

On an initial call for heat by the heating thermostat switch 131 is actuated from engagement with its lower contacts into engagement with its upper contacts thereby deenergizing the valve operating solenoids and energizing relay 108, respectively. On subsequent calls for heating the operation will be as described above.

It will be obvious to those skilled in the art that the modification just described also provides a control for a heating and cooling system in which the system is conditioned for the performance of a predetermined function upon a first call for that function and the system is placed in operation not only upon the first call for that function but also upon successive subsequent calls for that predetermined function.

In Fig. 3 I have illustrated a modified form of enclosure thermal control in which the control described above may be obtained by the use of a single condition responsive means within the enclosure. Before describing this modification in detail it may be pointed out that in the modifications of Figs. 1 and 2 each of the two room thermostats effects selective energization of its own relay and also a pair of switches, one exerting control over the relay by establishment of a holding circuit therefor, and the second exerting control functions over the conditioning apparatus. In the modification illustrated in Fig. 3 the last mentioned switches have not been shown, but it is obvious from the drawings that a single thermostat is adapted selectively to actuate the two conditioning control switches.

The present form of control utilizing a single thermal responsive means for positively controlling two relays through means including a pair of time controlled cams forms the subject matter of my copending application Serial No. 85,524, filed June 16, 1936, and assigned to the assignee of the present application. The control consists of a source of electricity indicated by reference numeral 65 and a transformer 75. Connected across the supply conductor 65 is an electrically driven timing mechanism 160 of any suitable type such as a telechron motor. The latter is adapted to drive through a suitable shaft (not shown) a pair of cams 161 and 162 having associated therewith cam follower arms 163 and 164, respectively, connected to one side of the secondary winding of transformer 75 through conductors 165 and 166. These cams are so constructed and positioned with respect to circuits controlled by the follower arms that the circuits are opened and closed in a predetermined manner. The circuit controlled by cam 161 is closed except for a very brief interval and the circuit controlled by cam 162 is open except for a period slightly in excess of the period that the circuit controlled by cam 161 is open. The purpose of this arrangement will appear as the description proceeds. The fixed contact associated with the cam 162 is connected by a conductor 167 to the bimetallic thermal responsive element 168 positioned within the enclosure and movable to the right on a decrease in temperature and to the left on an increase in temperature. The latter has associated therewith a pair of adjustably mounted contacts 169 and 170, the former of which is connected by a conductor 171 to a relay 172 and to a switch 173 associated with and adapted to be operated thereby. Contact 170 is connected by conductor 174 to a relay 175 and to one of a pair of normally open contacts of the switch mechanism 176 operated by the relay. The relays 172 and 175 are connected by a conductor 177 to the secondary winding of the transformer. One of the normally open contacts associated with switch 173 is connected by a conductor 178 to one of the pair of normally closed contacts associated with switch 176 and the two remaining contacts associated with switch 176 are connected by a conductor 179 to the contact mechanism of cam 161.

Relay windings 172 and 175 correspond to the heating control relay 87 and the cooling control relay 88, respectively, of the previously described modifications. When the thermal responsive element moves into engagement with contact 169 as upon a predetermined decrease of temperature to a value of, say 70°, the relay 172 is energized, provided that a circuit through the thermal responsive element is closed by the cam 162. The energizing circuit extends from winding of the secondary through conductors 165, 166, cam follower arm 164, conductor 167, bimetallic element 168 in engagement with contact 169 and conductor 171 to the relay windings and thence through conductor 177 back to the secondary winding of the transformer. Energization of relay 172 effects upward movement of switch 173 and also of the other switches similar to those illustrated in modifications of Figs. 1 and 2 conditioning the valves for heating and initiating operation of the heat pump. Switch 173 controls a holding circuit for the relay 172 extending through the cam mechanism 161. The circuit extends through conductor 165, cam follower arm 163 in engagement with its associated fixed contact whenever the circuit controlled by cam 162 is open, conductor 179, switch 176 in engagement with its lowermost contact, conductor 178, switch 173 in its closed position, relay 172 and thence through conductor 177 back to the secondary winding of the transformer.

It will be seen that the mechanism described gives a cycling control, i. e., the room thermostat is enabled periodically to close an energizing circuit for the relay and the relay is energized for a predetermined length of time irrespective of the position of the thermostat and deenergized by the cam mechanism after the thermostat moves out of engagement with its associated contacts.

When the enclosure is heated above 70° the bimetallic element moves out of engagement with the fixed contact 169 but relay 172 is not immediately deenergized because of the holding circuit. Thereafter, when the timing mechanism drives cam 161 to the position in which it is illustrated, the holding circuit for relay 172 is opened and the relay deenergized. On subsequent calls for heating the operation follows that outlined in connection with Figs. 1 and 2.

When the temperature in the enclosure rises to a value at which it is desirable to have cooling such as 80° the bimetallic element 168 engages contact 170, thereby closing an obvious energizing circuit for relay 175 extending from the secondary winding through conductors 165, 166, cam follower arm 164, conductor 167, bimetallic element 168 in engagement with contact 170, conductor 174 to the relay winding and thence back to the secondary of the transformer through conductor 177. Energization of relay 175 effects upward movement of its armature and the movement of switch 176 to close the upper normally open contacts associated therewith and the remaining switch mechanism (not shown). Switch 176 closes a holding circuit for the relay 175 extending through the cam mechanism 161 just as described in connection with the energization of relay 172. The switch mechanism (not shown) in Fig. 3 conditions the heat pump for cooling and initiates operation thereof. The relay 175 remains energized until the bimetallic element moves into disengagement from contact 170, whereupon the cam mechanism 161 deenergizes the relay after a predetermined length of time as described in connection with relay 172.

On subsequent calls for cooling the operation follows that described in connection with Figs. 1 and 2.

Those skilled in the art will realize from the preceding description that my invention may be utilized with various types of enclosure thermal controls as well as with various types of heating and cooling systems and that it is not limited to the temperature ranges used above for purposes of illustration. The above modifications and equivalents are intended to be within the scope of my invention.

What I claim as new and desire to secure by Letters Patent of the United States, is:

1. In combination, an enclosure, a reversible heat exchange system for heating and cooling said enclosure, means operative for conditioning said system for heating, means operative for conditioning said system for cooling, means for operating said system, a first, second and third control means for said three first mentioned means, respectively, a source of energy, a fourth control means adapted selectively to connect said first and second mentioned control means to said source, condition responsive means within said enclosure operable to a first position when heating is desired and to a second position when cooling is desired, means controlled thereby for controlling the connection of said fourth control means to said source upon initial operations thereof to said heating and cooling positions, and other means controlled thereby for controlling the connection of said third control means to said source upon said initial operations and upon subsequent successive operations thereof to the same position.

2. In combination, reversible heat transfer means for an enclosure including a compressor and a pair of complementary interconnected evaporator-condenser units, one inside and the other outside said enclosure, and each having valve connections with said compressor selectively operable for heating and for cooling said enclosure, thermal responsive means for starting operation of said compressor upon variation of the enclosure temperature beyond predetermined minimum and maximum limits and stopping operation of said compressor upon recurrence of the enclosure temperature to a predetermined value between said limits, and means for selectively operating said valve connections including an electroresponsive device energized under the control of said thermal responsive means upon variation of the enclosure temperature beyond one of said limits and having connections under the control of said thermal responsive device for maintaining said electroresponsive device energized until the enclosure temperature varies beyond the other of said limits.

3. In combination, reversible heat transfer means for an enclosure comprising a heat exchanger unit within said enclosure, a heat exchanger unit outside of said enclosure, a compressor and connections for circulating heat transfer fluid between said heat exchanger units, valve means in said connections for selectively controlling and reversing the heating and cooling functions of said heat exchanger units, a motor for operating said compressor, a first temperature control means responsive to a predetermined low temperature limit in said enclosure for effecting the adjustment of said valves for heating said enclosure, motor control means energized upon the actuation of said first temperature control means for simultaneously starting said motor, said first temperature control means effecting the deenergization of said motor control means upon a predetermined rise in temperature above said low temperature limit for stopping said motor, a second temperature control means responsive to a predetermined high temperature limit in said enclosure for adjusting said valves for cooling said enclosure, means for energizing said motor control means in response to the actuation of said second temperature control means for simultaneously starting said motor, said second temperature control means effecting the deenergization of said motor control means upon a predetermined drop in temperature within said enclosure below said high temperature limit for stopping said motor.

4. A reversible heat transfer system for an enclosure comprising an evaporator-condenser unit within said enclosure, an evaporator-condenser unit outside of said enclosure, a compressor and connections for circulating heat transfer fluid between said evaporator-condenser units, valves in said connections for selectively controlling and reversing the heating and cooling functions of said evaporator-condenser units, a motor for operating said compressor, thermally actuated means responsive to predetermined low and high temperature limits within said enclosure for correspondingly adjusting said valves for heating and cooling said enclosure and for simultaneously starting said motor, and means actuated upon a predetermined rise in temperature above said low limit and a predetermined drop in temperature below said high limit for stopping said motor, and means for maintaining the adjustment of said valves upon the stopping of said motor.

5. A reversible heat transfer system for an enclosure comprising a heat exchanger unit within said enclosure, a heat exchanger unit outside of said enclosure, a compressor and connections for circulating heat transfer fluid between said units, valves in said connections for controlling the direction of fluid flow from one of said units to the other of said units, a first means responsive to a predetermined low temperature limit in said enclosure for adjusting said valves for heating said enclosure, a second means responsive to a predetermined high temperature limit in said enclosure for adjusting said valves for cooling said enclosure, and means controlled jointly by said two temperature responsive means for driving said compressor upon the adjustment of said valves and for stopping said compressor at predetermined temperatures between said limits without altering the adjustment of said valves.

6. In combination, a reversible heat transfer means for an enclosure comprising a compressor, a pair of complementary, interconnected, evaporator-condenser units connected to said compressor, valve means for controlling the direction of flow of heat transfer fluid from said compressor selectively to said units, thermal responsive means for selectively operating said valve means in accordance with predetermined temperature limits in said enclosure, means for operating said compressor, and means responsive to predetermined variations of temperature between said limits within said enclosure for controlling said compressor operating means independently of the condition of said valve means.

7. In combination a reversible heat transfer device having a pair of heat exchange elements and an operating means connected with said elements for effecting the transfer of heat therebetween and separate reversing means for reversing the connections of said elements with said operating means to reverse the heat transfer therebetween, a pair of thermal responsive control means, each separately operable for starting and stopping operation of said operating means in a different temperature range, and means under the joint control of said separately operable control means for operating said reversing means only upon alternate operation of said separately operable control means to start operation of said operating means.

HARRY R. CRAGO.